United States Patent
Niu et al.

(10) Patent No.: US 12,534,605 B2
(45) Date of Patent: Jan. 27, 2026

(54) PROPYLENE COPOLYMER, PREPARATION METHOD THEREFOR, AND APPLICATION THEREOF

(71) Applicant: DALIAN UNIVERSITY OF TECHNOLOGY, Liaoning (CN)

(72) Inventors: Hui Niu, Liaoning (CN); Zhe Hua, Liaoning (CN); Zongke He, Liaoning (CN); Shuhui Liu, Liaoning (CN); Zhuo Bao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 979 days.

(21) Appl. No.: 17/754,128

(22) PCT Filed: Dec. 17, 2019

(86) PCT No.: PCT/CN2019/125861
§ 371 (c)(1),
(2) Date: Jul. 26, 2022

(87) PCT Pub. No.: WO2021/056858
PCT Pub. Date: Apr. 1, 2021

(65) Prior Publication Data
US 2022/0389205 A1    Dec. 8, 2022

(30) Foreign Application Priority Data

Sep. 25, 2019    (CN) .......................... 201910913025.3

(51) Int. Cl.
*C08L 23/16*    (2006.01)
*C08F 2/00*    (2006.01)
(Continued)

(52) U.S. Cl.
CPC .............. *C08L 23/16* (2013.01); *C08F 2/001* (2013.01); *C08F 4/6421* (2013.01);
(Continued)

(58) Field of Classification Search
None
See application file for complete search history.

(56) References Cited

U.S. PATENT DOCUMENTS

| 3,627,852 A | 12/1971 | Aishima et al. |
| 2008/0161513 A1* | 7/2008 | Wang ...................... C08F 10/00 502/103 |

(Continued)

FOREIGN PATENT DOCUMENTS

| CN | 101910258 A | 12/2010 |
| CN | 102174225 A | 9/2011 |

(Continued)

OTHER PUBLICATIONS

Wang Aihui, Thermoreversible cross-linking of ehtylene propylene copolymer rubbers, Polymer Chemistry (Year: 2017).*
(Continued)

*Primary Examiner* — Arrie L Reuther
*Assistant Examiner* — Devin Mitchell Darling
(74) *Attorney, Agent, or Firm* — NKL Law; Allen Xue (57) ABSTRACT

A propylene copolymer, a preparation method therefor, and an application thereof are provided. The copolymer forms a cross-linked network by means of a reaction between a furan-containing propylene copolymer and a small molecule of a coupling agent, thereby achieving a chemical bond connection between a polypropylene resin phase and an ethylene-propylene copolymer elastomer phase, fundamentally strengthening the force between the two phases, and improving the mechanical properties of a material. Meanwhile, the copolymer can achieve the decrosslinking of a material during melt processing such that the material has thermoplasticity, and after cooling, it can be crosslinked again to produce network structure.

11 Claims, 2 Drawing Sheets

(51) Int. Cl.
  *C08F 4/642* (2006.01)
  *C08F 224/00* (2006.01)
  *C08L 23/12* (2006.01)

(52) U.S. Cl.
  CPC .......... *C08F 4/6425* (2013.01); *C08F 4/6428* (2013.01); *C08F 224/00* (2013.01); *C08L 23/12* (2013.01); *C08F 2810/40* (2013.01); *C08L 2205/02* (2013.01); *C08L 2205/22* (2013.01); *C08L 2207/02* (2013.01); *C08L 2314/02* (2013.01)

(56) References Cited

U.S. PATENT DOCUMENTS

2010/0069589 A1  3/2010  Bradin
2018/0057642 A1* 3/2018  Suprakas ................. C08F 8/48

FOREIGN PATENT DOCUMENTS

| CN | 108017728 A | 5/2018 |
| CN | 109293929 A | 2/2019 |
| EP | 0407096 A2 | 1/1991 |

OTHER PUBLICATIONS

Wang, Aihui, "Design and Synthesis of Ethylene-propylene Rubber with Reversible Cross-linking Function", Science-Engineering(A), China Master's Theses Full-Text Database, vol. 2, Feb. 15, 2019; ISSN: 1674-0246; pp. 33-40.

Tan, Hongsheng et al.;Phase morphology and impact toughness of impact polypropylene copolymer; Polymer; vol. 46; Apr. 25, 2005, pp. 3522-3527; Available online Mar. 21, 2005.

Shi, Jianjun et al.; "Simultaneous cross-linking as a way to control physical growth of random ethylene-propylene copolymer during formation of high-impact polypropylene"; Polymer; vol. 85; pp. 10-18; Feb. 24, 2016, Available online Jan. 11, 2016.

* cited by examiner

PROPYLENE COPOLYMER, PREPARATION METHOD THEREFOR, AND APPLICATION THEREOF

TECHNICAL FIELD

The present disclosure relates to a propylene copolymer, a preparation method therefor, and an application thereof, in particular to a preparation method of a propylene copolymer having a thermoreversible crosslinking structure and its application for an impact resistance resin.

BACKGROUND

Polypropylene heterophasic copolymer, as one of the main varieties of polypropylene resin, by dispersing ethylene/α-olefin copolymers having the elastomer properties in polypropylene matrix, overcomes the deficiency of homopolymer polypropylene resin in toughness (in particular to low-temperature toughness), which greatly broadens the application of polypropylene resin. Multistage propylene polymerization and ethylene/α-olefin copolymerization are carried out continuously in reactor, which is the current trend of preparing polypropylene heterophasic copolymer. Firstly, isotactic polypropylene resin matrix is synthesized in a first-stage reactor, and then the generated polypropylene is transferred to a second-stage reactor to continue the copolymerization reaction of ethylene and propylene (or ethylene and other α-olefins), so as to synthesize copolymers having rubber properties and realize their in-situ dispersion in the polypropylene resin matrix, providing toughness for the polypropylene resin. The toughening mechanism is that the rubber phase in the propylene copolymer can absorb or partially absorb the impact energy at the fracture so as to improve the overall impact strength of the material. The main factors affecting the toughening effect include three aspects as follows: (1) Rubber phase content: it is mentioned in Patent U.S. Pat. No. 3,627,852 that this rubber phase can play an obvious toughening effect only when it reaches certain content. (2) Dispersion size and uniformity of rubber phase: rubber phase is generally distributed in the polypropylene resin matrix as dispersed phase. When the size of dispersed phase is about 1 μm, the rubber phase can play a good role in toughening polypropylene (Journal of Applied Polymer Science, 1996, 60, 1391-1403), and dispersed phase having too large or too small size will not be conducive to the improvement of material performance. However, due to the nonpolar characteristic of polyolefin itself, the force between the two phases is very weak. In addition, there is no chemical bonding between the two phases. The phase separation will gradually develop with the increase of heat treatment time or frequency, and the dispersed phase (elastomer copolymer) is prone to large-scale aggregation. Jinyong Dong et al., of Institute of Chemistry, Chinese Academy of Sciences, obtained impact resistance polypropylene copolymer having stable size of rubber phase by crosslinking the rubber phase during polymerization (Polymer, 2016, 85, 10-18), solving the problems of gradual development of phase separation and the aggregation of rubber phase during processing. (3) Size of the interaction force between rubber phase and resin matrix phase (i.e. compatibility): enhancing the interaction between the two phases is very important to inhibit phase separation and improve material performance. At present, the compatibility between the two phases is improved by introducing ethylene/propylene copolymer having block structure in the polymerization process, but the improvement effect is very limited since there is no chemical bond between the two phases.

Diels Alder (D-A) reaction ([4+2] cyclization reaction) between furan and maleimide has characteristics of easy availability of raw materials and easy occurrence of reverse D-A reaction (rD-A). D-A reaction occurs between furan and maleimide at room temperature or heating condition (about 60° C.) and rD-A reaction occurs at about 120° C., which is an effective way to prepare high-performance materials. The problem of poor compatibility between resin phase and rubber phase can be fundamentally solved if the aforementioned reaction is used to realize the chemical bond between the two phases, so as to obtain the impact resistance polymer material with excellent performance. And, the chemical bond can be fractured at 120° C. so as to meet the requirements of material melt processing, and chemical bond linking can be achieved when cooling after processing so as to obtain new functional materials.

SUMMARY OF THE INVENTION

The present disclosure provides a new-type propylene copolymer, includes propylene in a mass content of 49% to 95%, ethylene in a mass content of 3% to 49%, a furan substituted olefin monomer in a mass content of 1% to 30%, and a coupling agent in a mass content of 0.1% to 30%.

The furan substituted olefin monomer has the following structure:

wherein, $R^1$, $R^2$, and $R^3$ are the same or different from each other, and $R^1$, $R^2$, and $R^3$ are independently selected from hydrogen, methyl, ethyl, and isopropyl groups, and m is an integer ranging from 1 to 12.

The coupling agent is aliphatic or aromatic hydrocarbon containing maleimide substituents at both ends, having the following structure:

wherein, $R^4$ is selected from alkyl having 1 to 20 carbon atoms.

Another object of the present disclosure is to provide a method for preparing the aforementioned propylene copolymer, including the following steps of:

S1. preparation of polypropylene resin: mixing a Ziegler-Natta catalyst, a cocatalyst, propylene and furan substituted olefin monomer for polymerization reaction;

S2. preparation of ethylene-propylene elastomer: emptying, after completion of the reaction in step S1, the residual propylene, and introducing a mixture comprising ethylene, propylene and furan substituted olefin monomer into the reaction system in step S1 for polymerization reaction.

S3. coupling reaction of polymers: mixing, after completion of the reaction in step S2, the polymerization product with the coupling agent to get a premixed raw material, adding the premixed raw material into an extruder for melt extrusion to obtain the propylene copolymer.

Further, for the above technical solution, in step S1, an amount of the Ziegler Natta catalyst is 0.0005% to 0.1% of the mass of the propylene, and preferably is 0.001% to 0.01%; an amount of the furan substituted olefin monomer is 0.1% to 5% of the mass of the propylene, and preferably is 0.5% to 2%.

Further, for the above technical solution, in step S1, a reaction temperature of the polymerization reaction is −20° C. to 120° C., and preferably is 50° C. to 90° C.; a reaction time is 0.1 hour to 10 hours, and preferably is 0.5 hours to 5 hours; a reaction pressure is 0.01 MPa to 6 MPa, and preferably is 0.1 MPa to 4 MPa.

Further, in the above technical solution, hydrogen is added, before the polymerization reaction, to the reaction system, and the amount of the hydrogen added is 0.01% to 0.5% of the mass of the propylene in step S1, and preferably is 0.01% to 0.2%.

Further, in the above technical solution, the Ziegler-Natta catalyst in step S1 includes component I to component III as follows:

component I: a chloride of Ti. The Ti element in the Ziegler-Natta catalyst is 0.5% to 10% by weight, and the chloride of Ti is selected from at least one of $TiCl_3$, $TiCl_4$ and $TiOCl_3$;

component II: a magnesium chloride. The Mg element in the Ziegler-Natta catalyst is 5% to 25% by weight;

component III: an internal electron donor. The internal electron donor in the Ziegler-Natta catalyst is 1% to 30% by weight; and the internal electron donor includes diethyl succinate, dibutyl adipate, diethyl phthalate, di-n-butyl phthalate, diisobutyl phthalate, succinate acid ester or 2,2-diisobutyl-1,3-dimethoxypropane, and 9,9-bis (methoxymethyl) fluorene.

Further, in the above technical solution, a cocatalyst is added to the reaction system before the polymerization reaction in step S1. The cocatalyst is one of alkylaluminum or alkylaluminoxane.

In some embodiments, the alkylaluminum is trialkylaluminum, or a mixture composed of trialkylaluminum with halogenated alkylaluminum or polyhalogenated alkylaluminum, wherein the trialkylaluminum is preferably at least one of triethylaluminum, triisobutylaluminum, tri-n-butylaluminum, tri-n-hexylaluminum, and tri-n-octylaluminium, and the halogenated alkylaluminum is preferably $AlEt_2Cl$, and the polyhalogenated alkylaluminum is preferably $Al_2Et_3Cl_3$. The alkylaluminoxane is preferably at least one of methylaluminoxane and isobutylaluminoxane.

The amount of the cocatalyst added is calculated by a molar ratio of the Al in the cocatalyst to the Ti in the Ziegler Natta catalyst, which is Al:Ti=10 to 20000, and preferably is 100 to 10000. Further, in the above technical solution, an external electron donor is added into the reaction system before the polymerization reaction in step S1.

In some embodiments, the external electron donor is the same as or different from the internal electron donor. When the external electron donor is different from the internal electron donor, the external electron donor is a compound having a structure of $R_1R_2Si(OR)_2$, wherein $R_1$ and $R_2$ are both alkyl having 1 to 18 carbon atoms, cycloalkyl having 3 to 18 carbon atoms, or aryl having 6 to 18 carbon atoms, and R is alkyl having 1 to 5 carbon atoms.

Further, in the above technical solution, the external electron donor is preferably at least one of tetramethoxysilane, dimethyldimethoxysilane, tetraethoxysilane, triethoxyethylsilane, dicyclopentyloxydiethylsilane, diphenyldimethoxysilane, and diphenyldiethyloxysilane.

Further, in the above technical solution, the amount of the external electron donor added is 0.01 to 100 times of the metal Ti element in the Ziegler Natta catalyst by molar, and preferably is 1 to 50 times.

Further, in the above technical solution, the amount of the ethylene added in step S2 is 1% to 100% of the mass of the propylene added in step S1, and preferably is 10% to 40%. The amount of the propylene added in step S2 is 1% to 100% of the mass of the propylene added in step S1, and preferably is 10% to 40%. The amount of the furan substituted olefin added is 1% to 40% of the total added mass of the ethylene and the propylene in step S2, and preferably is 5% to 20%.

Further, for the above technical solution, in step S2, the reaction temperature is −20° C. to 120° C., and preferably is 45° C. to 95° C.; the reaction time is 0.1 hours to 10 hours, and preferably is 0.5 hours to 4 hours; the reaction pressure is 0.01 MPa to 6 MPa, and preferably is 0.1 MPa to 4 MPa.

Further, in some embodiments, hydrogen is added to the reaction system before the polymerization reaction in step S1. The amount of the hydrogen added is 0.01% to 0.5% of the mass of the propylene in step S1.

Further, in some embodiments, hydrogen is added to the reaction system before the polymerization reaction in step S2. The amount of the hydrogen added is 0.001% to 5% of the total mass of the ethylene and α-olefin monomer, preferably is 0.005% to 1%, and more preferably is 0.02% to 0.15%.

Further, in some embodiments, the amount of the coupling agent added in step S3 is 0.1% to 40% of the mass of the product in step S2, and preferably is 1% to 10%.

Further, in some embodiments, the temperature for melt extrusion of the mixture of the polymerization product and the coupling agent in step S3 is 160° C. to 250° C., and preferably is 180° C. to 230° C.

The propylene copolymer in the present disclosure is a material having a reversible crosslinking network structure. The role of the coupling agent is to achieve chemical bonding between the polypropylene resin prepared in step S1 and the ethylene-propylene copolymer elastomer prepared in step S2, forming a crosslinking network structure, thereby strengthening the acting force between the two phases. Using the thermal reversibility of D-A reaction, the decrosslinking of the material can be achieved when the copolymer is heated to more than 120° C., so that the material has thermoplasticity. the material can be crosslinked again to form a network structure when the temperature is cooled below 60° C., strengthening the mechanical performance of the material.

The present disclosure also provides a use of the propylene copolymer for impact resistance polymer resin material.

DETAILED DESCRIPTION OF DRAWINGS

DETAILED DESCRIPTION OF PREFERRED EMBODIMENTS

The following embodiments are described as further illustration, but do not limit the protection scope of the present disclosure. The furan substituent contained olefin monomer A, furan substituent contained olefin monomer B, coupling agent C, and coupling agent D used in the comparative examples and embodiments of the present disclosure are obtained through the following ways or methods.

Furan Substituent Contained Olefin Monomer:

The furan substituent contained olefin monomer can be purchased commercially or synthesized directly. For synthetic furan substituent contained olefin monomer, the present invention provides a conventional synthesis method, which is not a limitation on furan substituent contained olefin monomer.

1). Furan Substituent Contained Olefin Monomer A

An n-butyllithium solution (90 mmol) was added into 50 mL of anhydrous tetrahydrofuran with 147 mmol of furan dissolved therein at −78° C., and the mixture was heated to room temperature for reacting 4 hours and then cooled to −78° C. 126 mmol of 5-bromo-1-pentene solution was dissolved in 20 mL of anhydrous tetrahydrofuran, and the solution was added dropwise into the above reaction system and stirred at room temperature overnight. The reaction solution was poured into ice water and extracted with ethyl acetate and dried with anhydrous MgSO$_4$, and then the solvent and unreacted 5-bromo-1-pentene were removed by means of reduced pressure distillation to obtain the product of furan pentene A having a structural formula of:

2). Furan Substituent Contained Olefin Monomer B

A N-butyl lithium solution (44 mmol) was added into 20 mL of anhydrous tetrahydrofuran with 73.5 mmol of furan dissolved therein at −78° C., and the mixture was heated to room temperature for reacting 4 hours and then cooled to −78° C. 68 mmol of 8-bromo-1-octylene solution was dissolved in 10 mL of anhydrous tetrahydrofuran, and the solution was added dropwise into the above reaction system and stirred at room temperature overnight. The reaction solution was poured into ice water and extracted with ethyl acetate and dried with anhydrous MgSO$_4$, and then the solvent and unreacted 8-bromo-1-octylene were removed by means of reduced pressure distillation to obtain the product of furan octylene B having a structural formula of:

Coupling Agent:

The coupling agent can be purchased commercially or synthesized directly. For the synthesis of the coupling agent containing maleimide at both ends, the present invention provides a conventional synthesis method, which is not a limitation on the structure of the coupling agent.

1) Coupling Agent C:

Coupling agent C was purchased from Energy Chemical Company, CAS No.: 13676-54-5.

2) Coupling Agent D:

Synthesis method: 10 g of furan-protected maleic anhydride and 7 mL of triethylamine were dissolved in 60 ml of methanol, and in an ice-water bath 2.92 g of hexanediamine dissolved in 40 mL of methanol was added dropwise in the above mixture to form a solution. Under the protection of nitrogen, the solution was heated to reflux at 70° C. to 80° C. for 48 hours to get a product. The product was filtered and dried. A small amount of toluene (30 mL to 50 mL) was added to the product, and the mixture was heated to reflux at 120° C. for 48 hours. The solvent was removed by reduced pressure distillation to obtain the final product D having a structural formula as below:

Comparative Example 1

2 kg of liquid propylene and 0.1 MPa of hydrogen were added to a 10 L of polymerization reactor. At 30° C., 0.076 g of diphenyldimethoxysilane, 0.36 g of triethylaluminum and 60 mg of Ziegler Natta catalyst were successively added to the reactor. The reactor was heated to 75° C. to react for 120 minutes. 1524 g of the polypropylene product was obtained. The structure and performance of the product are shown in Table 1.

Comparative Example 2

2 kg of liquid propylene and 0.1 MPa of hydrogen were added to a 10 L of polymerization reactor. At 30° C., 0.076 g of diphenyldimethoxysilane, 0.36 g of triethylaluminum and 60 mg of Ziegler Natta catalyst were successively added to the reactor. The reactor was heated to 75° C. to react for 60 minutes. 850 g of polypropylene was obtained.

The residual propylene in the reactor was emptied, and then a gas mixture of 300 g of ethylene and 300 g of propylene, and 0.1 MPa of hydrogen were introduced to the reactor. The reactor was heated to 80° C. to react for 40 min. 1040 g of product was finally obtained.

In the obtained product, the mass content of ethylene is 11.5% and the mass content of propylene is 88.5%. The structure and performance of the product are shown in Table 1.

Comparative Example 3

2 kg of liquid propylene and 0.25 MPa of hydrogen were added to a 10 L of polymerization reactor. At 30° C., 0.076 g of diphenyldimethoxysilane, 0.36 g of triethylaluminum and 60 mg of Ziegler Natta catalyst were successively added to the reactor. The reactor was heated to 75° C. to react for 60 minutes. 990 g of polypropylene was obtained.

The residual propylene in the reactor was emptied, and then a gas mixture of 300 g of ethylene and 300 g of propylene, and 0.15 MPa of hydrogen were introduced to the reactor. The reactor was heated to 80° C. to react for 40 min. 1370 g of product was finally obtained.

In the obtained product, the mass content of ethylene is 18.0% and the mass content of propylene is 82.0%. The structure and performance of the product are shown in Table 1.

Comparative Example 4

2 kg of liquid propylene, 10 g of furan substituent contained olefin monomer A and 0.1 MPa of hydrogen were added to a 10 L of polymerization reactor. At 30° C., 0.076 g of diphenyldimethoxysilane, 0.36 g of triethylaluminum and 60 mg of Ziegler Natta catalyst were successively added to the reactor. The reactor was heated to 75° C. to react for 60 minutes. 780 g of polypropylene was obtained.

The residual propylene in the reactor was emptied, 20 g of furan substituent contained olefin monomer A was added to the reactor, then a gas mixture of 300 g of ethylene and 300 g of propylene, and 0.1 MPa of hydrogen were introduced to the reactor. The reactor was heated to 80° C. to react for 40 min. 950 g of product was finally obtained.

In the obtained product, the mass content of ethylene is 11.8%, the mass content of propylene is 86.1%, and the mass content of the monomer A is 2.1%. The structure and performance of the product are shown in Table 1.

Embodiment 1

2 kg of liquid propylene, 10 g of furan substituent contained olefin monomer A and 0.1 MPa of hydrogen were added to a 10 L of polymerization reactor. At 30° C., 0.076 g of diphenyldimethoxysilane, 0.36 g of triethylaluminum and 60 mg of Ziegler Natta catalyst were successively added to the reactor. The reactor was heated to 75° C. to react for 60 minutes. 780 g of polypropylene was obtained.

The residual propylene in the reactor was emptied, 20 g of furan substituent contained olefin monomer A was added to the reactor, then a gas mixture of 300 g of ethylene and 300 g of propylene, and 0.1 MPa of hydrogen were introduced to the reactor. The reactor was heated to 80° C. to react for 40 min. 950 g of polymerization product was finally obtained.

950 g of the polymerization product was mixed with 50 g of the coupling agent C and then added to 35-type double-screw extruder (from Coperionkeya Nanjing Machinery Co., Ltd.) for melting. The melting section temperature of the extruder is 160° C., the melt conveying section temperature is 200° C., and the outlet temperature is 180° C. The extruded product was cooled by circulating water bath and cut to obtain the target product.

In the obtained target product, the mass content of ethylene is 11.2%, the mass content of propylene is 81.8%, the mass content of the monomer A is 2.0%, and the mass content of the coupling agent C is 5.0%. The structure and performance of the product are shown in Table 1.

Embodiment 2

2 kg of liquid propylene, 10 g of furan substituent contained olefin monomer A and 0.1 MPa of hydrogen were added to a 10 L of polymerization reactor. At 30° C., 0.080 g of diphenyldimethoxysilane, 0.45 g of triethylaluminum and 60 mg of Ziegler Natta catalyst were successively added to the reactor. The reactor was heated to 75° C. to react for 60 minutes. 780 g of polypropylene was obtained.

The residual propylene in the reactor was emptied, 40 g of furan substituent contained olefin monomer A was added to the reactor, then a gas mixture of 300 g of ethylene and 300 g of propylene, and 0.1 MPa of hydrogen were introduced to the reactor. The reactor was heated to 80° C. to react for 40 min. 985 g of polymerization product was finally obtained.

985 g of the polymerization product was mixed with 90 g of the coupling agent C and then added to the 35-type double-screw extruder for melting. The melting section temperature of the extruder is 160° C., the melt conveying section temperature is 200° C., and the outlet temperature is 180° C. The extruded product was cooled by circulating water bath and cut to obtain the target product.

In the obtained target product, the mass content of ethylene is 14.8%, the mass content of propylene is 73.2%, the mass content of the monomer A is 3.6%, and the mass content of the coupling agent C is 8.4%. The structure and performance of the product are shown in Table 1.

Embodiment 3

2 kg of liquid propylene, 10 g of furan substituent contained olefin monomer A and 0.1 MPa of hydrogen were added to a 10 L of polymerization reactor. At 30° C., 0.076 g of diphenyldimethoxysilane, 0.36 g of triethylaluminum and 60 mg of Ziegler Natta catalyst were successively added to the reactor. The reactor was heated to 75° C. to react for 60 minutes. 780 g of polypropylene was obtained.

The residual propylene in the reactor was emptied, 20 g of furan substituent contained olefin monomer A was added to the reactor, then the gas mixture of 300 g of ethylene and 300 g of propylene, and 0.1 MPa of hydrogen were introduced to the reactor. The reactor was heated to 80° C. to react for 40 min. 950 g of polymerization product was finally obtained.

950 g of the polymerization product was mixed with 75 g of the coupling agent D and then added to the 35-type double-screw extruder for melting. The melting section temperature of the extruder is 160° C., the melt conveying section temperature is 200° C., and the outlet temperature is 180° C. The extruded product was cooled by circulating water bath and cut to obtain the target product.

In the obtained target product, the mass content of ethylene is 10.4%, the mass content of propylene is 80.3%, the mass content of the monomer A is 2.0%, and the mass content of the coupling agent D is 7.3%. The structure and performance of the product are shown in Table 1.

Embodiment 4

2 kg of liquid propylene, 10 g of furan substituent contained olefin monomer A and 0.1 MPa of hydrogen were added to a 10 L of polymerization reactor. At 30° C., 0.076 g of diphenyldimethoxysilane, 0.36 g of triethylaluminum and 60 mg of Ziegler Natta catalyst were successively added to the reactor. The reactor was heated to 75° C. to react for 90 minutes. 1120 g of polypropylene was obtained.

The residual propylene in the reactor was emptied, 20 g of furan substituent contained olefin monomer A was added to the reactor, then a gas mixture of 300 g of ethylene and 300 g of propylene, and 0.1 MPa of hydrogen were introduced to the reactor. The reactor was heated to 80° C. to react for 30 minutes. 1250 g of polymerization product was finally obtained.

1250 g of the polymerization product was mixed with 40 g of the coupling agent C and then added to the 35-type double-screw extruder for melting. The melting section temperature of the extruder is 160° C., the melt conveying section temperature is 200° C., and the outlet temperature is 180° C. The extruded product was cooled by circulating water bath and cut to obtain the target product.

In the obtained target product, the mass content of ethylene is 6.7%, the mass content of propylene is 88.8%, the mass content of the monomer A is 1.4%, and the mass content of the coupling agent C is 3.1%. The structure and performance of the product are shown in Table 1.

Embodiment 5

2 kg of liquid propylene, 10 g of furan substituent contained olefin monomer A and 0.1 MPa of hydrogen were added to a 10 L of polymerization reactor. At 30° C., 0.080 g of diphenyldimethoxysilane, 0.45 g of triethylaluminum and 60 mg of Ziegler Natta catalyst were successively added to the reactor. The reactor was heated to 75° C. to react for 60 minutes. 780 g of polypropylene was obtained.

The residual propylene in the reactor was emptied, 80 g of furan substituent contained olefin monomer B was added to the reactor, then a gas mixture of 300 g of ethylene and 300 g of propylene, and 0.1 MPa of hydrogen were introduced to the reactor. The reactor was heated to 80° C. to react for 40 min. 1210 g of polymerization product was finally obtained.

1210 g of the polymerization product was mixed with 120 g of the coupling agent D and then added to the 35-type double-screw extruder for melting. The melting section temperature of the extruder is 160° C., the melt conveying section temperature is 200° C., and the outlet temperature is 180° C. The extruded product was cooled by circulating water bath and cut to obtain the target product.

In the obtained target product, the mass content of ethylene is 21.0%, the mass content of propylene is 65.6%, the mass content of the monomer A is 0.5%, the mass content of the monomer B is 3.9%, and the mass content of the coupling agent D is 9.0%. The structure and performance of the product are shown in Table 1.

Embodiment 6

2 kg of liquid propylene, 15 g of furan substituent contained olefin monomer B and 0.1 MPa of hydrogen were added to a 10 L of polymerization reactor. At 30° C., 0.080 g of diphenyldimethoxysilane, 0.45 g of triethylaluminum and 60 mg of Ziegler Natta catalyst were successively added to the reactor. The reactor was heated to 75° C. to react for 60 minutes. 900 g of polypropylene was obtained.

The residual propylene in the reactor was emptied, 100 g of furan substituent contained olefin monomer B was added to the reactor, and then a gas mixture of 300 g of ethylene and 300 g of propylene, and 0.1 MPa of hydrogen were introduced to the reactor. The reactor was heated to 80° C. to react for 40 minutes. 1250 g of polymerization product was finally obtained.

1250 g of the polymerization product was mixed with 100 g of the coupling agent C and then added to the 35-type double-screw extruder for melting. The melting section temperature of the extruder is 160° C., the melt conveying section temperature is 200° C., and the outlet temperature is 180° C. The extruded product was cooled by circulating water bath and cut to obtain the target product.

In the obtained target product, the mass content of ethylene is 17.6%, the mass content of propylene is 69.5%, the mass content of the monomer B is 5.5%, and the mass content of the coupling agent C is 7.4%. The structure and performance of the product are shown in Table 1.

Embodiment 7

2 kg of liquid propylene, 10 g of furan substituent contained olefin monomer A and 0.2 MPa of hydrogen were added to a 10 L of polymerization reactor. At 30° C., 0.070 g of diphenyldimethoxysilane, 0.45 g of triethylaluminum and 60 mg of Ziegler Natta catalyst were successively added to the reactor. The reactor was heated to 75° C. to react for 60 minutes. 880 g of polypropylene was obtained.

The residual propylene in the reactor was emptied, 40 g of furan substituent contained olefin monomer A was added to the reactor, then a gas mixture of 300 g of ethylene and 300 g of propylene, and 0.075 MPa of hydrogen were introduced to the reactor. The reactor was heated to 80° C. to react for 40 min. 1220 g of polymerization product was finally obtained.

1220 g of the polymerization product was mixed with 50 g of the coupling agent C and then added to the 35-type double-screw extruder for melting. The melting section temperature of the extruder is 160° C., the melt conveying section temperature is 200° C., and the outlet temperature is 180° C. The extruded product was cooled by circulating water bath and cut to obtain the target product.

In the obtained target product, the mass content of ethylene is 16.1%, the mass content of propylene is 77.4%, the mass content of the monomer A is 2.6%, and the mass content of the coupling agent C is 3.9%. The structure and performance of the product are shown in Table 1.

Embodiment 8

2 kg of liquid propylene, 10 g of furan substituent contained olefin monomer A and 0.25 MPa of hydrogen were added to a 10 L of polymerization reactor. At 30° C., 0.070 g of diphenyldimethoxysilane, 0.45 g of triethylaluminum and 60 mg of Ziegler Natta catalyst were successively added to the reactor. The reactor was heated to 75° C. to react for 60 minutes. 980 g of polypropylene was obtained.

The residual propylene in the reactor was emptied, 40 g of furan substituent contained olefin monomer A was added to the reactor, then a gas mixture of 300 g of ethylene and 300 g of propylene, and 0.15 MPa of hydrogen were introduced to the reactor. The reactor was heated to 80° C. to react for 40 min. 1350 g of polymerization product was finally obtained.

1350 g of the polymerization product was mixed with 60 g of the coupling agent C and then added to the 35-type double-screw extruder for melting. The melting section temperature of the extruder is 160° C., the melt conveying section temperature is 200° C., and the outlet temperature is 180° C. The extruded product was cooled by circulating water bath and cut to obtain the target product.

In the obtained target product, the mass content of ethylene is 15.7%, the mass content of propylene is 78.1%, the mass content of the monomer A is 1.9%, and the mass content of the coupling agent C is 4.3%. The structure and performance of the product are shown in Table 1.

Embodiment 9

2 kg of liquid propylene, 90 g of furan substituent contained olefin monomer A and 0.25 MPa of hydrogen were added to a 10 L of polymerization reactor. At 30° C., 0.070 g of diphenyldimethoxysilane, 0.80 g of triethylaluminum and 80 mg of Ziegler Natta catalyst were successively added to the reactor. The reactor was heated to 75° C. to react for 60 minutes. 980 g of polypropylene was obtained.

The residual propylene in the reactor was emptied, 200 g of furan substituent contained olefin monomer A was added to the reactor, then a gas mixture of 400 g of ethylene and 400 g of propylene, and 0.15 MPa of hydrogen were introduced to the reactor. The reactor was heated to 80° C. to react for 40 min. 1220 g of polymerization product was finally obtained.

1220 g of the polymerization product was mixed with 250 g of the coupling agent C and then added to the 35-type double-screw extruder for melting. The melting section temperature of the extruder is 160° C., the melt conveying section temperature is 200° C., and the outlet temperature is 180° C. The extruded product was cooled by circulating water bath and cut to obtain the target product.

In the obtained target product, the mass content of ethylene is 10.6%, the mass content of propylene is 56.6%, the mass content of the monomer A is 15.8%, and the mass content of the coupling agent C is 17.0%. The structure and performance of the product are shown in Table 1.

Embodiment 10

2 kg of liquid propylene, 10 g of furan substituent contained olefin monomer A and 0.1 MPa of hydrogen were added to a 10 L of polymerization reactor. At 30° C., 0.076 g of diphenyldimethoxysilane, 0.36 g of triethylaluminum and 60 mg of Ziegler Natta catalyst were successively added to the reactor. The reactor was heated to 75° C. to react for 60 minutes. 780 g of polypropylene was obtained.

The residual propylene in the reactor was emptied, 20 g of furan substituent contained olefin monomer A was added to the reactor, then a gas mixture of 400 g of ethylene and 200 g of propylene, and 0.1 MPa of hydrogen was introduced to the reactor. The reactor was heated to 80° C. to react for 40 min. 1070 g of polymerization product was finally obtained.

1070 g of the polymerization product was mixed with 75 g of the coupling agent D and then added to the 35-type double-screw extruder for melting. The melting section temperature of the extruder is 160° C., the melt conveying section temperature is 200° C., and the outlet temperature is 180° C. The extruded product is cooled and granulated by circulating water bath to obtain the target product.

In the obtained target product, the mass content of ethylene is 19.8%, the mass content of propylene is 71.9%, the mass content of the monomer A is 1.7%, and the mass content of the coupling agent D is 6.6%. The structure and performance of the product are shown in Table 1.

TABLE 1

Composition and performance of polymers

| Product | Mass composition (wt %) | | | | Melt index (g/10 min) | Xylene soluble matter (wt %) | Hexane soluble matter (wt %) | Notched izod impact strength at 23° C. (kJ/m$^2$) | Notched izod impact strength at −30° C. (kJ/m$^2$) | Flexural modulus (MPa) |
|---|---|---|---|---|---|---|---|---|---|---|
| | Propylene | Ethylene | Furan olefin | Coupling agent | | | | | | |
| Comparative | 100 | 0 | 0 | 0 | 12 | 1.9 | 0.8 | 2.1 | — | 1330 |
| Comparative | 88.5 | 11.5 | 0 | 0 | 10 | 18.3 | 17.5 | 36.5 | 4.1 | 880 |
| Comparative | 82.0 | 18.0 | 0 | 0 | 35 | 27.7 | 25.9 | 31.2 | 2.5 | 633 |
| Comparative | 86.1 | 11.8 | 2.1 (A) | 0 | 10 | 17.9 | 17.2 | 38.5 | 4.8 | 810 |
| Embodiment | 81.8 | 11.2 | 2.0 (A) | 5.0 (C) | 10 | 17.9 | 0.9 | 42.8 | 7.8 | 970 |
| Embodiment | 73.2 | 14.8 | 3.6 (A) | 8.4 (C) | 12 | 20.8 | 0.7 | 45.6 | 10.9 | 954 |
| Embodiment | 80.3 | 10.4 | 2.0 (A) | 7.3 (D) | 10 | 17.9 | 0.5 | Unfractured | 25.9 | 1085 |
| Embodiment | 88.8 | 6.7 | 1.4 (A) | 3.1 (C) | 14 | 11.6 | 1.8 | 40.5 | 6.6 | 1266 |
| Embodiment | 65.6 | 21.0 | 0.5 (A), | 9.0 (D) | 8 | 35.5 | 0.5 | Unfractured | Unfractured | 1385 |
| Embodiment | 69.5 | 17.6 | 5.5 (B) | 7.4 (C) | 11 | 28.0 | 0.7 | Unfractured | Unfractured | 1350 |
| Embodiment | 77.4 | 16.1 | 2.6 (A) | 3.9 (C) | 19 | 27.9 | 2.0 | Unfractured | Unfractured | 1295 |
| Embodiment | 78.1 | 15.7 | 1.9 (A) | 4.3 (C) | 36 | 27.4 | 2.6 | Unfractured | Unfractured | 1110 |
| Embodiment | 56.6 | 10.6 | 15.8 (A) | 17.0 (C) | 33 | 21.3 | 0.1 | Unfractured | Unfractured | 1510 |
| Embodiment | 71.9 | 19.8 | 1.7 (A) | 6.6 (C) | 12 | 27.1 | 1.8 | 41.5 | 15.4 | 1050 |

Note a:

Unfractured means that the sample is not completely fractured under the impact test conditions.

Table 1 lists the performance data of the propylene copolymer. The xylene soluble matter represents the real content of the ethylene-propylene copolymer elastomer in the copolymer, and the hexane soluble matter represents the content of the ethylene-propylene copolymer elastomer without chemical bonding with the polypropylene resin.

Figure 1:
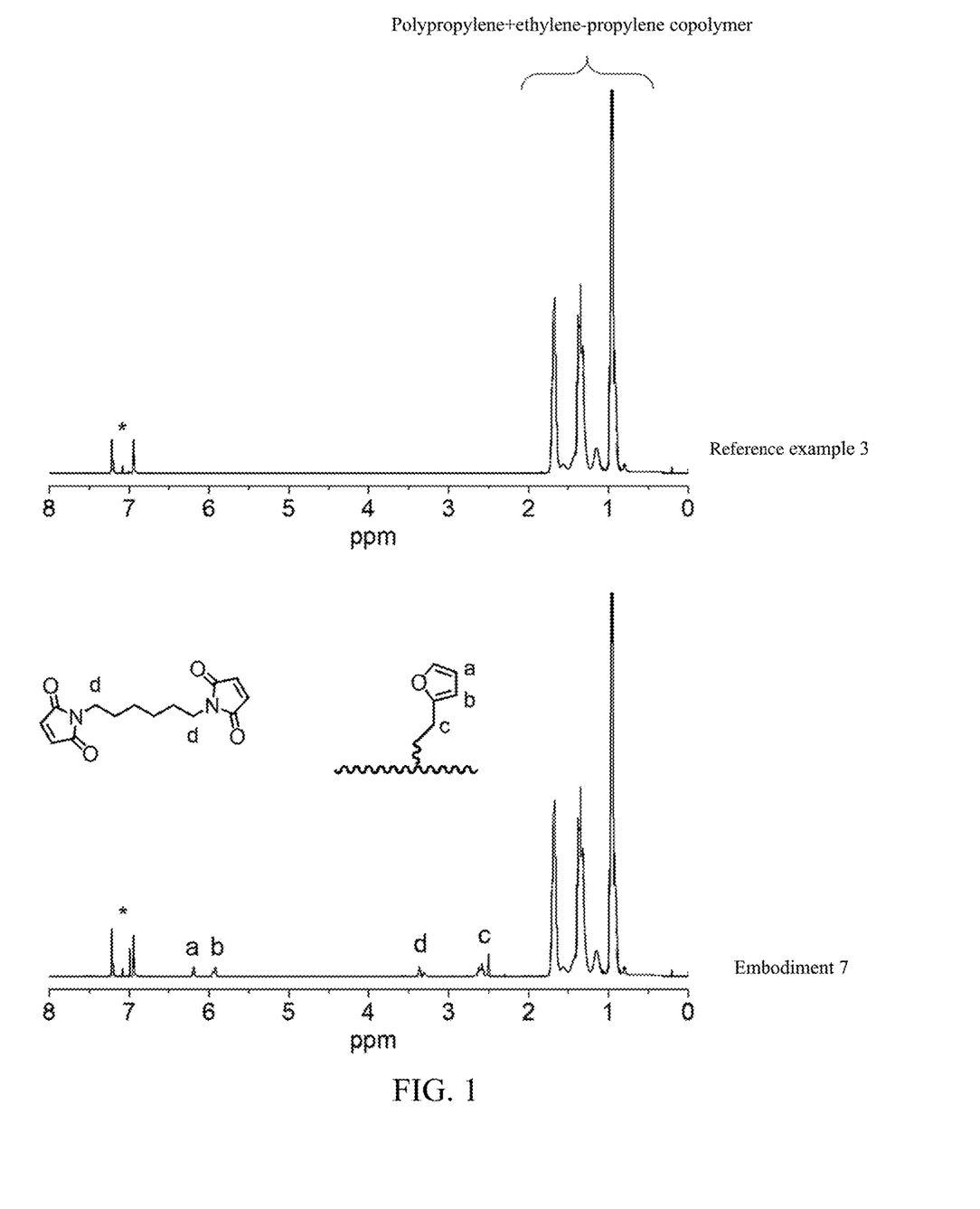
FIG. 1 is a comparison of $^1$H-NMR spectra of the products in Comparative Example 3 and Embodiment 7.
Figure 2:
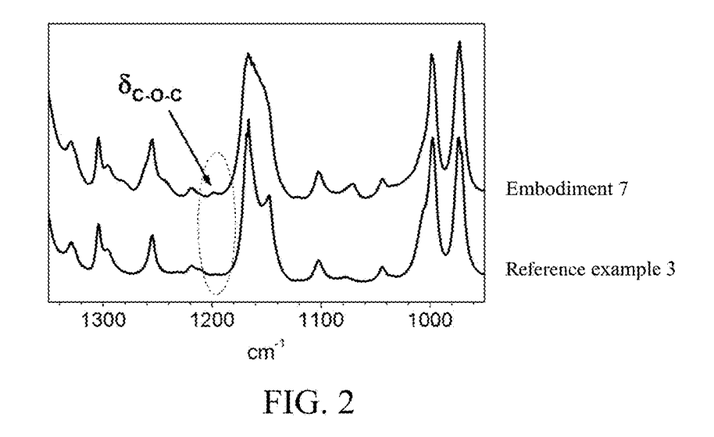
FIG. 2 is a comparison of infrared spectra of the products in Comparative Example 3 and Embodiment 7.
Figure 3:
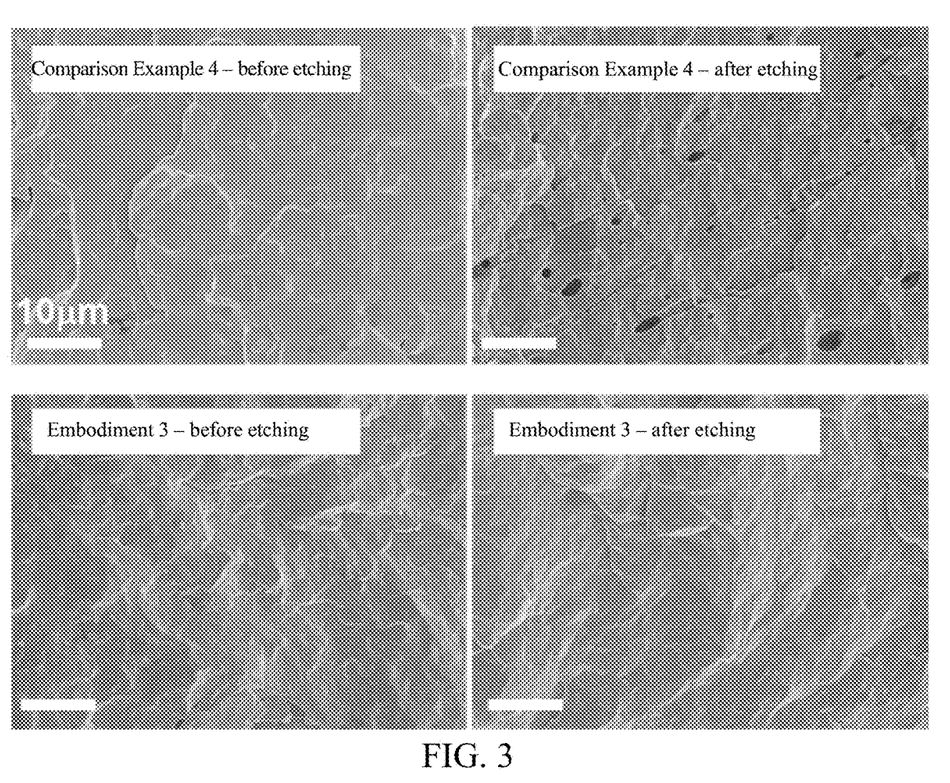
FIG. 3 is a comparison of scanning electron microscopy photos of the cross-section of the products in Comparative Example 4 and Embodiment 3 before and after hexane etching.

Firstly, compared with the comparative examples, a chemical bonding between the prepared polypropylene resin and the prepared ethylene-propylene copolymer elastomer is realized to form a crosslinking network structure due to the addition of furan olefin and coupling agent in the copolymer of the present disclosure, which can be confirmed by the fact that the content of the ethylene-propylene copolymer (boiling hexane soluble matter) without chemical bonding in the product is significantly lower than the total content of the ethylene-propylene copolymer (xylene soluble matter). In Comparative Examples 2, 3 and 4, the content of the boiling hexane soluble matter is close to the total content of the ethylene-propylene copolymer (xylene soluble matter) due to there is no chemical bonding between the prepared polypropylene resin and the prepared ethylene-propylene copolymer elastomer. The same conclusion can be drawn from the cross-section etching photos of Comparative Example 4 and Embodiment 3 (as shown in FIG. 3), that is, the ethylene-propylene copolymer elastomer in Comparative Example 4 can be dissolved by hexane to form a large number of holes, while the ethylene-propylene copolymer elastomer in Embodiment 3 is hardly dissolved. The above results show that the propylene copolymer prepared in the present disclosure is a new type propylene copolymer having a crosslinking network structure, and the action force between the two phases is enhanced due to the chemical bonding between the two phases (the formed crosslinking bond can be observed from the infrared spectra of FIG. 2), and finally the performance of the material is significantly improved.

Secondly, the copolymer of the present disclosure has a thermaoreversible crosslinking structure, that is, the crosslinking network can be de-crosslinked in the melt processing state (using the thermaoreversible Diels-Alder reaction between furan and maleimide groups), thereby enabling the material having thermoplasticity and can be repeatedly processed. The samples of all embodiments can be tested for melt index, showing that the material has thermoplasticty. And, comparing the results of Comparative Example 3 and Embodiment 8, it can be seen that the melt index of the two copolymers is similar (i.e. their processing performances are similar), but other performance of Embodiment 8 are significantly better than that of Comparative Example 3, showing that the propylene copolymer prepared in the present disclosure can produce the crosslinking network structure again after molding processing and cooling to the normal use conditions, greatly improving the performance of the material.

In conclusion, the propylene copolymer of the present disclosure is a new type material having a reversible crosslinking network structure. The propylene copolymer can de-crosslink during processing and ease for processing, and can crosslink again after molding and has good performance.

The invention claimed is:

1. A method for preparing a propylene copolymer, comprising:
S1. adding a first reactant mixture comprising a Ziegler-Natta catalyst, a cocatalyst, propylene, and a furan substituted olefin monomer in a reaction vessel to carry out a first polymerization reaction, wherein the first reactant mixture contains no ethylene;
S2. mixing a second reactant mixture comprising ethylene, propylene, and the furan substituted olefin monomer with a product of the first polymerization reaction with in the reaction vessel to carry out a second polymerization reaction; and
S3. mixing a product of the second polymerization reaction with a coupling agent to obtain a premixed raw material, extruding the premixed raw material using an extruder for melt extrusion to obtain the propylene copolymer,
wherein the propylene copolymer contains propylene in a mass content of 49% to 95%, ethylene in a mass content of 3% to 49%, the furan substituted olefin monomer in a mass content of 1% to 30%, and the coupling agent in a mass content of 0.1% to 30%.

2. The method according to claim 1, wherein:
in the first reactant mixture, an amount of the Ziegler-Natta catalyst is 0.0005% to 0.1% of the mass of the propylene, an amount of the furan substituted olefin monomer is 0.1% to 5% of the mass of the propylene, of and the first polymerization reaction is carried out at −20° C. to 120° C. for 0.1 hour to 10 hours under a pressure of 0.01 Mpa to 6 Mpa;
in the second reactant mixture, an amount of ethylene is 1% to 100% of the mass of propylene in the first reactant mixture, the amount of propylene is 1% to 100% of the mass of propylene in the first reactant mixture, the amount of the furan substituted olefin is 1% to 40% of the total mass of ethylene and propylene in the second reactant mixture, and the second polymerization reaction is carried out at −20° C. to 120° C. for 0.1 hours to 10 hours under a pressure of 0.01 MPa to 6 MPa; and
in step S3, an amount of the coupling agent added is 0.1% to 40% of the mass of the product of the second polymerization reaction, and the melt extrusion is carried out at 160° C. to 250° C.

3. The method according to claim 1, wherein, step S1 further comprises adding hydrogen to the reaction vessel, at an amount that is 0.01% to 0.5% of the mass of propylene in the first reactant mixture.

4. The method according to claim 1, wherein the Ziegler-Natta catalyst comprises component I, component II, and component III, wherein:
component I is chloride of Ti selected from $TiCl_3$, $TiCl_4$, $TiOCl_3$, and mixtures thereof, wherein the Ti element in the Ziegler-Natta catalyst is 0.5% to 10% by weight of the Ziegler-Natta catalyst;
component II is magnesium chloride, wherein the Mg element in the Ziegler-Natta catalyst is 5% to 25% by weight of the Ziegler-Natta catalyst; and
component III is an internal electron donor selected from diethyl succinate, dibutyl adipate, diethyl phthalate, di-n-butyl phthalate, diisobutyl phthalate, succinate or 2,2-diisobutyl-1,3-dimethoxypropane, 9,9-bis(methoxymethyl) fluorene, and mixtures thereof, wherein the internal electron donor in the Ziegler-Natta catalyst is 1% to 30% by weight of the Ziegler-Natta catalyst.

5. The method according to claim 1, wherein the cocatalyst in step S1 is alkylaluminum or alkylaluminoxane;
wherein the alkylaluminum is trialkylaluminum, or a mixture comprising trialkylaluminum with halogenated alkylaluminum or polyhalogenated alkylaluminum, wherein, the trialkylaluminum is selected from triethylaluminum, triisobutylaluminum, tri-n-butylaluminum, tri-n-hexylaluminum, tri-n-octylaluminium, and mixtures thereof, wherein the halogenated alkylaluminum comprises $AlEt_2Cl$, wherein the polyhalogenated alkylaluminum comprises $Al_2Et_3Cl_3$;

wherein the alkylaluminoxane is at least one of methylaluminoxane and isobutylaluminoxane;

wherein the amount of the cocatalyst is that a molar ratio of the Al in the cocatalyst to the Ti in the Ziegler Natta catalyst is Al:Ti=10 to 20000.

6. The method according to claim 1, wherein an external electron donor is added into the reaction system before vessel prior to an initiation of the first polymerization reaction, wherein the external electron donor is one or more selected from diethyl succinate, dibutyl adipate, diethyl phthalate, di-n-butyl phthalate, diisobutyl phthalate, succinate, 2,2-diisobutyl-1,3-dimethoxypropane, and 9,9-bis(methoxymethyl) fluorene, wherein the Ziegler Natta catalyst comprises a metal Ti element, and wherein a molar amount of the external electron donor is 0.01 to 100 times that of the metal Ti element in the Ziegler Natta catalyst.

7. The method according to claim 1, wherein an external electron donor is added into the reaction system before vessel prior to an initiation of the first polymerization reaction, wherein the external electron donor is of $R_1R_2Si(OR)_2$, wherein $R_1$ and $R_2$ are both alkyl having 1 to 18 carbon atoms, cycloalkyl having 3 to 18 carbon atoms, or aryl having 6 to 18 carbon atoms, and R is alkyl having 1 to 5 carbon atoms; and wherein the Ziegler Natta catalyst comprises a metal Ti element, and wherein a molar amount of the external electron donor is 0.01 to 100 times that of the metal Ti element in the Ziegler Natta catalyst.

8. The method of claim 1, wherein, in the propylene copolymer, the furan substituted olefin monomer is wherein, $R^1$, $R^2$, and $R^3$ are the same or different from each other, and $R^1$, $R^2$, and $R^3$ are independently selected from hydrogen, methyl, ethyl, and isopropyl; and m is an integer ranging from 1 to 12.

9. The method of claim 1, wherein, in the propylene copolymer, the coupling agent is wherein, $R^4$ is selected from alkyl having 1 to 20 carbon atoms.

10. The method according to claim 1, wherein the product of the first polymerization reaction is a polypropylene resin and the product of the second polymerization reaction is an ethylene-propylene elastomer.

11. The method according to claim 1, wherein the second reactant mixture further comprises an amount of hydrogen that is 0.001% to 0.5% of a total mass of ethylene, propylene, and the furan substituted olefin monomer.

* * * * *